United States Patent [19]
Ohira et al.

[11] Patent Number: 6,147,150
[45] Date of Patent: Nov. 14, 2000

[54] VIBRATION DAMPING PAINT

[75] Inventors: Yasuyuki Ohira, Seki; Masamitsu Muto, Gifu, both of Japan

[73] Assignee: Shishiai-Kabushikigaisha, Japan

[21] Appl. No.: 09/180,571

[22] PCT Filed: Dec. 1, 1997

[86] PCT No.: PCT/JP97/04381

§ 371 Date: Nov. 10, 1998

§ 102(e) Date: Nov. 10, 1998

[87] PCT Pub. No.: WO99/28394

PCT Pub. Date: Jun. 10, 1999

[51] Int. Cl.⁷ ....................................................... C08K 3/00
[52] U.S. Cl. ............................................ 524/425; 524/449
[58] Field of Search ....................................... 524/425, 449

[56] References Cited

U.S. PATENT DOCUMENTS

| | | | |
|---|---|---|---|
| 4,444,937 | 4/1984 | Badertsher | 524/425 |
| 4,657,963 | 4/1987 | Matsumoto et al. | 524/406 |

*Primary Examiner*—Edward J. Cain
*Attorney, Agent, or Firm*—Adams, Schwartz & Evans, P.A.

[57] ABSTRACT

A vibration damping coating is disclosed for use on cars, interior trims, construction materials, home electric appliances, etc. where damping of vibratory energy is desired. The coating contains in its base material mica flakes and calcium carbonate in a combined amount of 30–70% by weight. The weight proportion of the mica flakes and the calcium carbonate is 75/25–0/100. The vibration damping coating provides an excellent vibration damping property and will not crack or peel when used on a curbed surface.

9 Claims, 4 Drawing Sheets

VIBRATION DAMPING PAINT

This application is at national stage application, according to Chapter II of the Patent Cooperation Treaty.

1. Field of the Invention

This invention generally relates to a vibration damping coating for use on vehicles, interior trims, construction materials, home electric appliances and others to absorb and damp vibratory energy generated thereby or passing therethrough.

2. Background Art

Conventionally, vibration damping sheets are used on vehicles, interior trims, construction materials, home electric appliances and others to absorb and damp vibratory energy generated thereby or passing therethrough.

Such a sheet need be cut to pieces of a desired size and dimension, which are applied with an adhesive onto a portion of vibratory body where damping of vibration is desired. It is very time consuming to provide such cutting and adhering application, in particular when the surface of the portion is substantially curbed or hard to access. The sheet piece applied on a curbed surface may easily peel off.

It has also been proposed to prepare a vibration damping coating material using a viscous/elastic polymer such as a rubber or plastic material or asphalt material as a base component, in which a vibration damping promoter such as mica flakes is blended. Such a resin material can be conveniently applied on a desired surface by spraying means, eliminating said cutting and adhering processes. Even a curbed surface or narrow portion can be easily coated. Robotization of the spraying process is possible as well.

However, it was not practical to apply such a conventional coating material on a surface for a thickness over three (3) millimeters, as can be understood by a person skilled in the art. Accordingly, conventional vibration damping coating materials cannot provide adequate or desired damping of vibration energy.

Such a conventional coating material when applied "thick" on a curbed surface as shown in FIG. 7 will crack or peel sooner or later when subjected to repeated vibrations.

Accordingly, it is an object of the present invention to provide a vibration damping coating that can provide an excellent vibration damping property without cracking or peeling even when applied on a curbed surface.

SUMMARY OF THE INVENTION

The present invention is described in full in the following. The invention provides a vibration damping coating to be used on a number of objects, e.g. a vehicle, interior trim, construction material and electric appliance. The vibration damping coating of the present invention includes, as measured in a dried state, 30 to 90% by weight in combination of mica flakes and calcium carbonate, whose relative ratio is 75/25 to 0/100.

Preferably, the filming material or base material of the coating is a polymer material or a blend of polymer materials that provide a glass transition point −20 to 80° C., or more advantageously 0 to 40° C. Such polymer materials may be acrylic esters or metacrylic esters, or their selective combinations, or selective combinations of acrylic esters or metacrylic esters and styrene, or acryl-styrene copolymers. The base material may also contain di-2-ethylhexyl phthalate (DOP), dibutyl phthalate (DBP), and/or diisononyl phthalate (DINP), and/or a crosslinking agent.

Polyurethane and/or asphalt materials may also be utilized for the coating of the invention.

Easiness of handling and molding, availability and cost of ingredient materials, temperature property such as heat resistance or resistance against coldness, and weather resistance should be taken into due consideration. Applicable temperature ranges and ways of use of the vibration damping coating should also be taken into consideration.

Mica flakes can significantly improve the vibration damping capability of the vibration damping coating. The average aspect ratio by weight of mica flakes to be used is preferably 20 to 60. More preferably, the average aspect ratio is 30 to 40. Mica flakes with an aspect ratio below 20 would not provide a satisfactory vibration damping, while an aspect ratio over 60 would not provide a reliable coating. Such a vibration damping coating having an aspect ratio over 60 will easily crack in use and/or clog sprayer nozzles.

Calcium carbonate can also significantly improve the vibration damping capability of the coating. Either light calcium carbonate or heavy calcium carbonate, singly or together, can be effectively utilized, of which heavy calcium carbonate is preferred. Preferably, the average particle size of the calcium carbonate is 1 to 80 micrometers in consideration of cost and for prevention of nozzle clogging.

The mica flakes and calcium carbonate are preferably blended in a weight ratio 75/25 to 0/100. This preferable ratio is determined through the study conducted by the inventors. If the ratio is over 75/25, the resultant coating would easily crack or peel.

The blend of mica flakes and calcium carbonate is preferably blended in the base material in an amount of 30 to 70% by weight as measured when the coating is "dry". An amount below this range will not provide a satisfactory vibration damping while an amount over this range will result in inadequacy of the applicability of the coating.

The base material may additionally contain water or alcohol to provide an emulsion form. Such an emulsion may additionally contain a desired amount of a dispersant, filming agent, wet agent, thickener, antifoamer, viscosity controller and/or colorant.

All selected ingredients are mixed or blended well with a conventional mixer or blender.

The coating is applied on a surface portion of a vibratory object by means of an applicator such as an air spray gun, airless spray gun, or brush.

The base material may further contain an active ingredient or moment activator to promote the dipole moment in the coating, which can significantly improve the vibration damping property of the coating. A plurality of such activators may be contained.

The relationship between dipole moment and vibration energy absorption is briefly explained now. FIG. 1 schematically shows an orientation of dipoles 12 in a vibration damping coating 11 before application of a vibration energy thereonto. The dipoles 12 in the coating 11 are regarded stable. FIG. 2 schematically shows an orientation of the dipoles 12 when a vibration energy is applied onto the coating 11. The dipoles 12 are regarded unstable in such a parallel orientation, which possess "built-in" energy (provided from the applied vibration energy) to return to their stable state such as shown in FIG. 1.

The dipoles 12 consume energy as they return to a stable orientation, thus damping the vibration energy.

It is natural that the greater the dipole moment in the coating 11, the greater the consumption of vibration energy.

Moment activators to be blended may be compounds which themselves possess high dipole moment. Moment activators to be blended may alternatively be compounds which can significantly increase the dipole moment of the base material when blended therein.

A moment activator blended in the base material can significantly increase the dipole moment of the base material, three times to ten times or even more as schematically shown in FIG. 3. The increased dipole moment can consume the more vibration energy.

Such moment activators may be compounds having a benzothiazyl radical or radicals such as N,N-dicyclohexylbenzothiazyl-2-sulfenamde (DCHBSA), 2-mercaptobenzothiazole (MBT), dibenzothiazylsulfide (MBTS), N-cyclohexylbenzothiazyl-2-sulfenamide (CBS), N-tert-butylbenzothiazyl-2-sulfenamide (BBS), N-oxydiethylenebenzothiazyl-2-sulfenamide (OBS), or N,N-diisopropylbenzothiazyl-2-sulfenamide (DPBS).

Alternatively, such moment activators may be compounds having a benzotriazole radical or radicals such as 2-{2'-hydroxy-3'-(3", 4", 5", 6" tetrahydrophtaliridemethyl)-5'-methyphenyl}-benzotriazole (2HMPB), 2-{2'-hydroxy-5'-methylphenyl}-benzotriazole (2HMPB), 2-{2'-hydroxy-3'-t-butyl-5'-methylphenyl}-5-chlorobenzotriazole (2HBMPCB), 2-{2'-hydroxy-3', 5'-di-t-butylphenyl}-5-chlorobenzotriazole (2HDBPCB), having as a nucleus benzotriazole comprising an azole radical bound to a benzene ring, to which a phenyl radical is bound.

Still alternatively, such moment activators may be compounds having a diphenylacrylate radical or radicals such as ethyl-2-cyano-3, 3-di-phenylacrylate.

Alternatively, such moment activators may be compounds having a benzophenone radical or radicals such as 2-hydroxy-4-methoxybenzophenone-5-sulphonic acid (HMBPS).

Such a moment activator or a selected combination of activators is preferably blended in a base material in an amount of 10 to 100 parts by weight in 100 parts by weight of the base material. A blend less than 10 parts by weight will not provide a satisfactory promotion of dipole moment while a blend more than 100 parts by weight will result in poor mixing with the moment activator or activators as well as in poor integrity of the coated layer.

Accordingly, it is advantageous to select a moment activator to be blended in a base material by appropriately considering the SP values of the base material and the moment activator. SP values are an indication of compatibility between polymers. Their SP values should be close for adequate blending.

The amount of such a moment activator to be blended varies depending upon the type of the moment activator. The amount also varies depending upon the temperature of use and the energy to be transferred. Accordingly, the operation temperature and the magnitude of vibration to be applied should be taken into due consideration in selecting an appropriate amount of a moment activator to be blended.

The magnitude of dipole moment is indicated by the difference in dielectric constant ($\epsilon'$) between A and B shown in FIG. 4. The larger the difference, the greater the dipole moment.

The graph shown in FIG. 4 shows a relationship between dielectric constant ($\epsilon'$) and dielectric loss factor ($\epsilon''$). The relationship can be given by the following equation: dielectric loss factor ($\epsilon''$)=dielectric constant ($\epsilon'$)×dielectric tangent (tan $\delta$).

The inventors have discovered through their strenuous research that the higher the dielectric loss factor ($\epsilon$), the higher the loss factor ($\eta$) and loss tangent (tan $\delta$). Thus, there is a direct relationship among the dielectric loss factor ($\epsilon''$), loss factor ($\eta$) and dielectric tangent (tan $\delta$).

It was found that both loss factor ($\eta$) and loss tangent (tan $\delta$) are high when dielectric loss factor ($\epsilon''$) at 110 Hz is 50 or over, providing a vibration damping layer having an excellent vibration energy absorption capability.

EMBODIMENT

Figure 1:
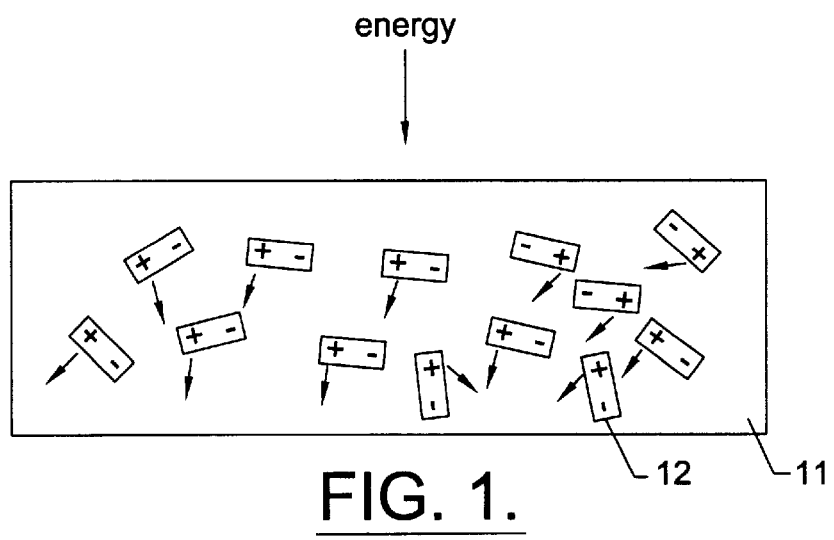
FIG. 1 schematically shows an arrangement or orientation of dipoles in a coating base material.
Figure 2:
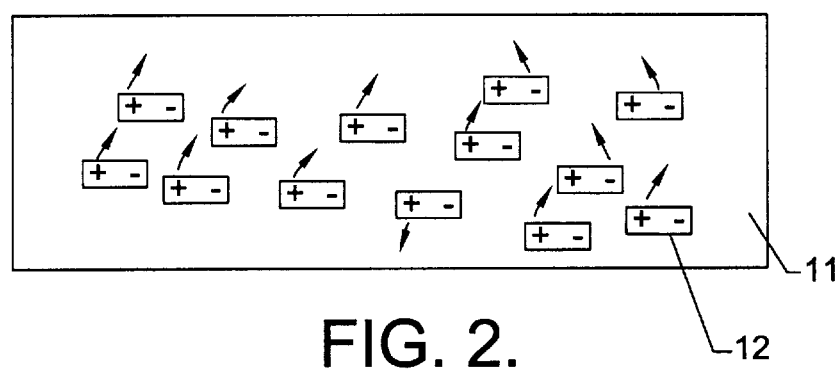
FIG. 2 schematically shows an orientation of the dipoles in the base material when a vibration energy is applied.
Figure 3:
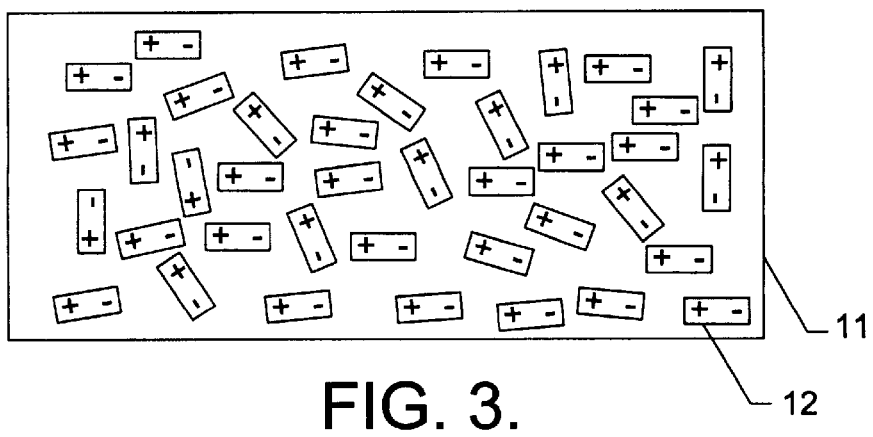
FIG. 3 schematically shows an increase of active dipoles in a base material where a moment activator is blended.
Figure 4:
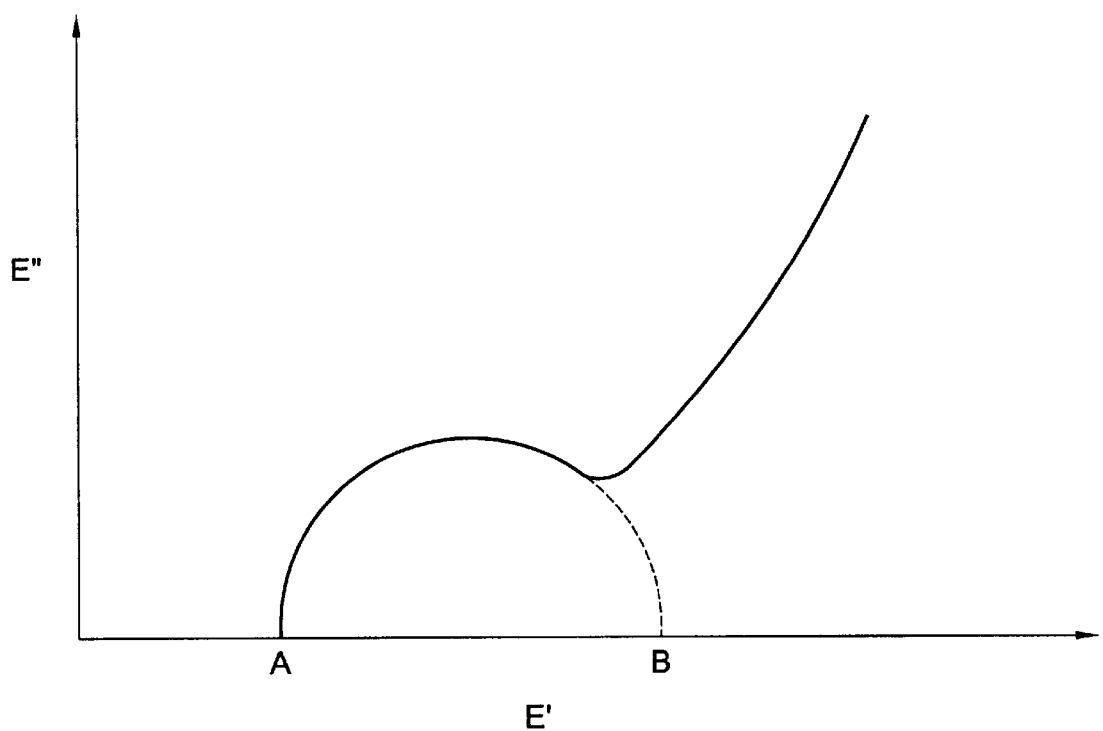
FIG. 4 is a graph which shows a relationship between the dielectric constant ($\epsilon'$) and dielectric loss factor ($\epsilon''$)
Figure 5:
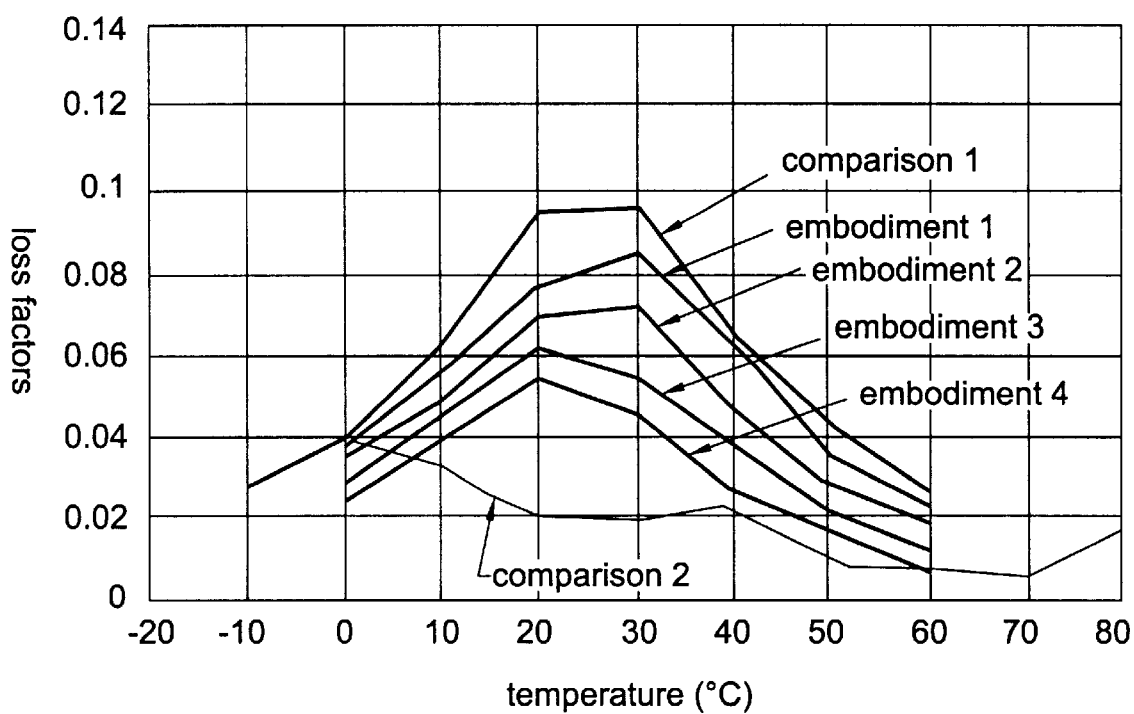
FIG. 5 is a graph showing the loss factors ($\eta$) of Embodiments 1–4 and Comparisons 1 and 2 in relation to the temperature.

Vibration damping layers 1 mm thick provided respectively on steel plates 1 mm thick were prepared using vibration damping coatings prepared according to Embodiments 1 to 4 and Comparison 1, whose respective components are given below in Table 1. The loss factors ($\eta$) of the layers were measured in relation to the temperature using a central excitation loss factor measurement device (CF5200) of Ono Sokki Kabushiki-Kaisha (Ono Measurements Corporation). FIG. 5 shows the measurements.

TABLE 1

| Ingredient | (Wt. %) | | | | |
|---|---|---|---|---|---|
| | Emb. 1 | Emb. 2 | Emb. 3 | Emb. 4 | Comp. 1 |
| Base Material | 44.5 | 44.5 | 44.5 | 44.5 | 44.5 |
| Mica | 33.45 | 22.3 | 11.15 | 0 | 44.6 |
| Ca Carbonate | 11.15 | 22.3 | 33.45 | 44.6 | 0 |
| Dispersant | 0.3 | 0.3 | 0.3 | 0.3 | 0.3 |
| Filming Agent | 0.71 | 0.71 | 0.71 | 0.71 | 0.71 |
| Viscosity Promoter | 1.4 | 1.4 | 1.4 | 1.4 | 1.4 |
| Colorant | 1.83 | 1.83 | 1.83 | 1.83 | 1.83 |
| Anti-foamer | 0.1 | 0.1 | 0.1 | 0.1 | 0.1 |
| Viscosity Controller | 7.6 | 7.6 | 7.6 | 7.6 | 7.6 |

The base material or emulsion was "BONCOAT BC-280" (acryl-styrene copolymer or polymer of acrylic ester) sold from Dai-Nippon Ink Chemicals Corporation. The mica flakes were "200HK" sold from Kurare Co., Ltd. The calcium carbonate was "Super SS" sold from Maruo Calcium Corporation. The dispersant was tripolisodium phosphate (10 wt. %) sold from Dai-Nippon Ink Chemicals Corporation, and the filming agent was ethylene glycol sold from Mitsubishi Chemicals, Inc., while the viscosity promoter was "ARON A30" sold from Toa Synthetics Co., Ltd. The colorant was "DISPERBLACK" sold from Dai-Nippon Ink Chemicals Corporation and the anti-foamer was "FOA-MASTER PC" sold from Sunnopco Company. Water was used as the viscosity controller.

Comparison 2 was sampled from "GELNUCK", a conventional vibration damping material sold from Nippon Automation Company.

FIG. 5 shows that the peak loss factors of Embodiments 1–4 and Comparison 1 were over "0.05", while that of Comparison 2 was "0.04".

Figure 6:
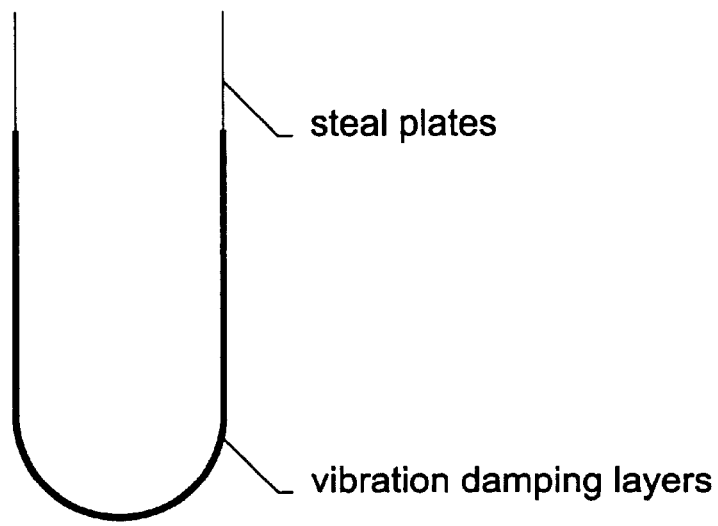
FIG. 6 shows a U-shaped steel plate provided with a vibration damping coating layer thereon.
Figure 7:
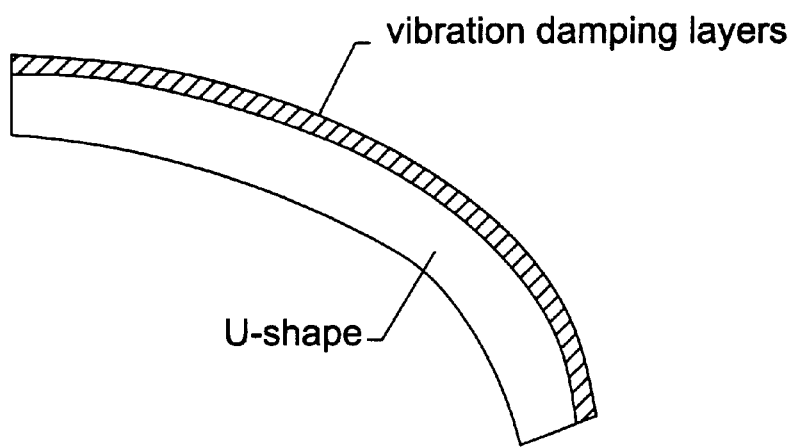
FIG. 7 shows a state where a coating layer is provided on a curbed surface.

The base plates were bent into a U-shape (R15) as shown in FIG. 6, on which Embodiments 1–4 and Comparisons 1 and 2 were respectively applied as layers at a room temperature. The appearances of the surfaces of the layers were investigated.

Comparisons 1 and 2 showed some cracking and peeling from the base plates, while Embodiment 1 showed a slow cracking. Embodiments 2–4 did not show any cracking or peeling.

Effects Expected of the Invention

A vibration damping coating of the present invention contains in the base material mica flakes and calcium carbonate in a combined amount of 30–70% by weight. The proportion of the mica flakes and calcium carbonate is 75/25–0/100. The vibration damping coatings of the present invention provide excellent vibration damping and will not crack or peel even when applied on a curbed surface.

What is claimed is:

1. A vibration damping coating comprising a polymeric base material having a dipole moment, said base material including at least one moment activator for increasing the magnitude of said dipole moment, and mica flakes and calcium carbonate blended in the base material in a combined amount of 30–70% by weight, the weight proportion of said mica flakes and said calcium carbonate being 75/25–0/100.

2. A vibration damping coating according to claim 1, wherein said base material has a glass transition point between −20° C. and 80° C.

3. A vibration damping coating according to claim 1, wherein said base material comprises an acrylic ester polymer or an acryl-styrene copolymer.

4. A vibration damping coating according to claim 1, wherein said vibration damping coating includes a dielectric loss factor at 110 Hz of at least 50.

5. A vibration damping coating according to claims 1, 2, 3, or 4, wherein said moment activator comprises a compound including at least one mercaptobenzothiazyl radical.

6. A vibration damping coating according to claims 1, 2, 3, or 4, wherein said moment activator comprises a compound including at least one benzotriazole radical.

7. A vibration damping coating according to claim 1, 2, 3, or 4, wherein said moment activator comprises a compound including at least one diphenylacrylate radical.

8. A vibration damping coating according to claim 1, 2, 3, or 4, wherein said moment activator comprises a compound including at least one benzophenone radical.

9. A vibration damping coating according to claims 1, 2, 3, or 4, wherein said moment activator is contained in said base material in an amount of 10–100 parts by weight in 100 parts by weight of said base material.

* * * * *